US011679674B1

(12) United States Patent
Chapman

(10) Patent No.: US 11,679,674 B1
(45) Date of Patent: Jun. 20, 2023

(54) IMPLEMENT COUPLER FOR WORK VEHICLE

(71) Applicant: Deere & Company, Moline, IL (US)

(72) Inventor: Marc Chapman, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/661,627

(22) Filed: May 2, 2022

(51) Int. Cl.
| | | |
|---|---|---|
| *B60K 25/06* | (2006.01) | |
| *B60L 1/00* | (2006.01) | |
| *B60K 17/28* | (2006.01) | |
| *F16H 7/02* | (2006.01) | |
| *A01B 71/06* | (2006.01) | |
| *A01B 59/042* | (2006.01) | |

(52) U.S. Cl.
CPC .............. *B60K 25/06* (2013.01); *A01B 71/06* (2013.01); *B60K 17/28* (2013.01); *B60L 1/003* (2013.01); *F16H 7/02* (2013.01); *A01B 59/042* (2013.01)

(58) Field of Classification Search
None
See application file for complete search history.

(56) References Cited

U.S. PATENT DOCUMENTS

| | | | |
|---|---|---|---|
| 6,148,928 A * | 11/2000 | Spears | A01B 59/068 |
| | | | 280/417.1 |
| 10,404,137 B2 | 9/2019 | Bering | |
| 11,031,844 B2 * | 6/2021 | Bering | B62D 49/065 |
| 2020/0323127 A1 * | 10/2020 | Takaki | A01C 15/005 |

* cited by examiner

*Primary Examiner* — Faye M Fleming
(74) *Attorney, Agent, or Firm* — Klintworth & Rozenblat IP LLP

(57) ABSTRACT

An implement coupler for a work vehicle includes a support frame having a drive opening and an array of electric machine mounts arranged about the drive opening. A gearbox is mounted on the support frame and has a gearbox shaft extending through the drive opening. At least one drive pulley is coupled to the gearbox for rotation. At least one endless member is disposed about the drive pulley for rotation therewith. A first electric machine is mounted on the support frame at a first of the electric machine mounts and having a first input pulley coupled to the drive pulley by the at least one endless member.

20 Claims, 7 Drawing Sheets

IMPLEMENT COUPLER FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and particularly to couplers for operatively coupling implements to work vehicles.

BACKGROUND OF THE DISCLOSURE

Work vehicles, such as construction vehicles, forestry vehicles and agricultural vehicles, may perform a variety of tasks. In the case of an agricultural tractor, for instance, a prime mover (e.g., a diesel engine or electric drive) generates power to drive a transmission which moves wheels or treads to propel the tractor as well as a power takeoff (PTO) to provide power to a work implement being pulled or pushed through a field by the tractor. Implement couplers have been developed, for example, to allow attachment of the PTO to a rear-mounted implement.

SUMMARY OF THE DISCLOSURE

This disclosure provides an improved implement coupler for coupling a work vehicle to a work implement so that power from the work vehicle power take off may be transferred to the work implement.

In one aspect, the disclosure provides an implement coupler for a work vehicle including a power takeoff (PTO) has a support frame with a drive opening and an array of electric machine mounts arranged about the drive opening. A gearbox is mounted on the support frame and has a gearbox shaft extending through the drive opening. The gearbox is configured to receive rotational power from the power takeoff. At least one drive pulley is coupled to the gearbox for rotation. At least one endless member is disposed about the at least one drive pulley for rotation therewith. A first electric machine is mounted on the support frame at a first of the electric machine mounts and has a first input pulley coupled to the at least one drive pulley by the at least one endless member.

In another aspect, a second electric machine is mounted on the support frame at a second of the electric machine mounts and has a second input pulley coupled to the at least one drive pulley by the at least one endless member. A third electric machine is mounted on the support frame at a third of the electric machine mounts and has a third input pulley coupled to the at least one drive pulley by the at least one endless member. An idler pulley is mounted on the support frame at a fourth of the electric machine mounts and is coupled to the at least one drive pulley by the at least one endless member. A fourth electric machine is mounted on the support frame at a fourth of the electric machine mounts and having a fourth input pulley coupled to the at least one drive pulley by the at least one endless member.

Other aspects include a second electric machine mounted on the support frame at a second of the electric machine mounts and has a second input pulley. The at least one endless member includes a first endless member and a second endless member. The first input pulley is coupled to the at least one drive pulley by the first endless member, and the second input pulley is coupled to the at least one drive pulley by the second endless member. The at least one drive pulley has a first drive pulley, coupled to the gearbox shaft and to the first endless member, and a second drive pulley, coupled to the gearbox shaft and to the second endless member.

Other aspects have a second electric machine mounted on the support frame at a second of the electric machine mounts and has a second input pulley. A third electric machine is mounted on the support frame at a third of the electric machine mounts and has a third input pulley. A fourth electric machine is mounted on the support frame at a fourth of the electric machine mounts and has a fourth input pulley. The at least one endless member includes a first endless member and a second endless member. The first input pulley and the second input pulley are coupled to the at least one drive pulley by the first endless member, and the third input pulley and the fourth input pulley are coupled to the at least one drive pulley by the second endless member. The at least one drive pulley has a first drive pulley, coupled to the gearbox shaft and to the first endless member, and a second drive pulley coupled to the gearbox shaft and to the second endless member.

Still other aspects include an idler pulley mounted on the support frame at a second of the electric machine mounts and coupled to the at least one drive pulley by the at least one endless member. And, the implement coupler may be in combination with a tractor having a frame and a prime mover to which the PTO is operatively connected to be driven by the prime mover to transmit a mechanical force to the implement coupler via the gearbox.

In another aspect, the disclosure provides an implement coupler fora work vehicle including a power takeoff configured to provide a mechanical force. The implement coupler includes a support frame configured to support a first electric machine at a first machine mounting location, a second electric machine at a second machine mounting location, a third electric machine at a third machine mounting location, and a fourth electric machine at a fourth machine mounting location. A gearbox is mounted on the support frame and is configured to receive rotational power from the power takeoff. In a first configuration, the first electric machine is mounted on the support frame, a drive pulley is mounted on a gearbox shaft of the gearbox, and a belt is coupled to the first electric machine and to the drive pulley. In a second configuration, the first and second electric machines are mounted on the support frame, a drive pulley is mounted on the gearbox shaft, and a belt is coupled to the first and second electric machines and to the drive pulley. In a third configuration, the first, second and third electric machines are mounted on the support frame, first and second drive pulleys are mounted on the gearbox shaft, a first belt is coupled to the first and second electric machines and to the first drive pulley, and a second belt is coupled to the third electric machine and to the second drive pulley. In a fourth configuration, the first, second, third and fourth electric machines are mounted on the support frame, first and second drive pulleys are mounted on the gearbox shaft, a first belt is coupled to the first and second electric machines and to the first drive pulley, and a second belt is coupled to the third and fourth electric machines and to the second drive pulley.

In another aspect, in the first configuration, an idler pulley is mounted on the support frame in the second machine mounting location and the belt of the first configuration is further coupled thereto. In the third configuration, a second idler pulley is mounted on the support frame in the fourth machine mounting location and the second belt is further coupled thereto.

In a further aspect, in the first configuration, a belt tensioner is mounted on the support frame between the first machine mounting location and the second machine mounting location and engaged with the belt. In the fourth configuration, a first belt tensioner is mounted on the support frame between the first machine mounting location and the second machine mounting location and engaged with the first belt, and a second belt tensioner is mounted on the support frame between the third machine mounting location and the fourth machine mounting location and engaged with the second belt.

In yet a further aspect, in the first configuration, a belt tensioner is mounted on the support frame between the first machine mounting location and the gearbox shaft and engaged with the belt. In the fourth configuration, a first belt tensioner is mounted on the support frame between the first machine mounting location and the gearbox shaft and engaged with the first belt, and a second belt tensioner is mounted on the support frame between the fourth machine mounting location and the gearbox shaft and engaged with the second belt.

In an aspect, in the first configuration, an idler pulley is mounted on the support frame between the first machine mounting location and the second machine mounting location and engaged with the belt. In the fourth configuration, a first idler pulley is mounted on the support frame between the first machine mounting location and the second machine mounting location and engaged with the first belt, and a second idler pulley is mounted on the support frame between the third machine mounting location and the fourth machine mounting location and engaged with the second belt.

In an aspect, first, second, third, and fourth electrical couplers are configured to be coupled to the support frame. The first electrical coupler is configured to be electrically coupled to the first electric machine. The second electrical coupler is configured to be electrically coupled to the second electric machine. The third electrical coupler is configured to be electrically coupled to the third electric machine. The fourth electrical coupler is configured to be electrically coupled to the fourth electric machine. Each electrical coupler includes an output configured to provide access to the generated electrical power.

Still other aspects include an input drive is operatively connected to the gearbox and to the power takeoff. And, a gearbox shaft is operatively coupled to the input drive and to the gearbox. The gearbox shaft is configured to transfer the mechanical force provided by the power takeoff to the gearbox. And further, the implement coupler can be used with a tractor including a frame and a prime mover to which the PTO is operatively connected to be driven by the prime mover to transmit a mechanical force to the implement coupler via the gearbox.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
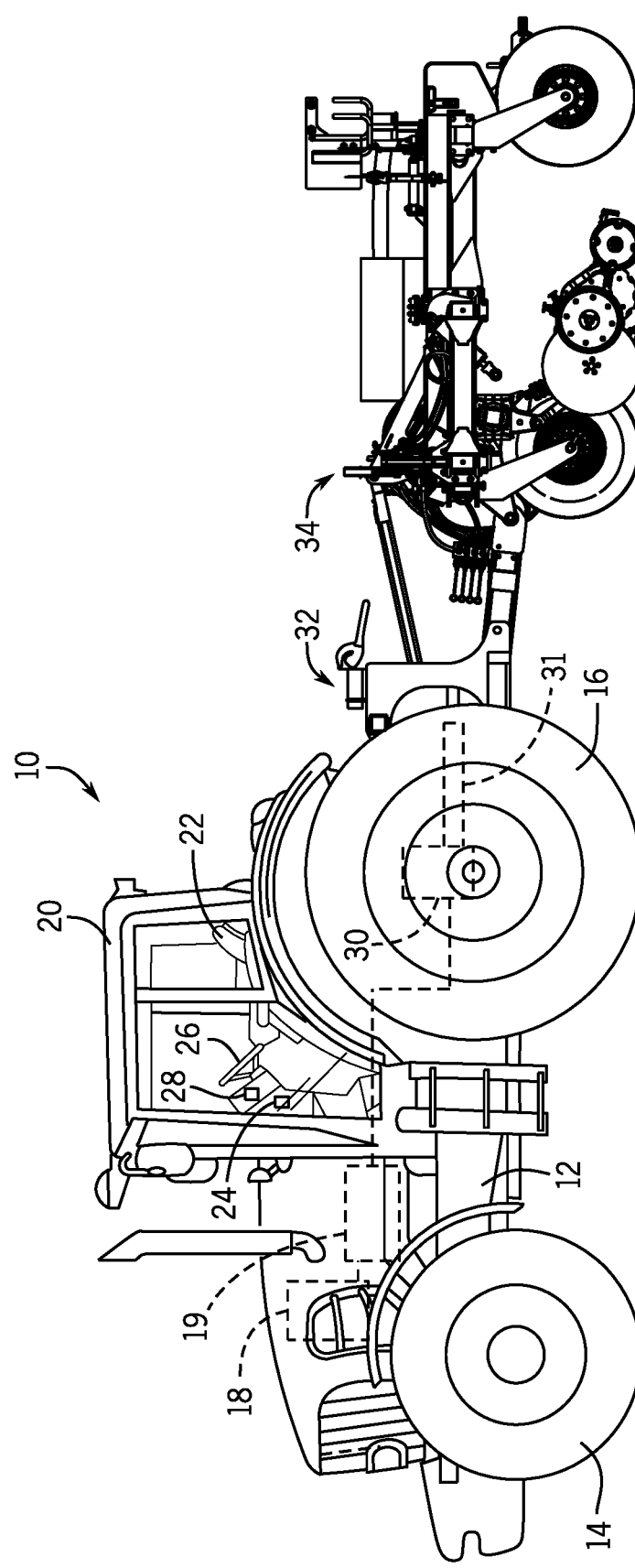
FIG. 1 is an elevational side view of a work vehicle, and more specifically, of an agricultural vehicle such as a tractor, including an example implement coupler.

The following describes one or more example embodiments of the disclosed work vehicle implement coupler, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral," and "transverse" may be used. Such terms are defined, at least in part, with respect to an annular passages, shafts, or components, and/or the direction of exhaust flow. As used herein, the term "longitudinal" indicates an orientation along the length of the subject element; the term "lateral" indicates an orientation along a width of the apparatus and orthogonal to the longitudinal orientation; and the term "transverse" indicates an orientation along the height of the apparatus and orthogonal to the longitudinal and lateral orientations.

An implement coupler has a modular electric machine system which is designed to allow one or an array of electric machines, such as generators, motors or alternators, coupled thereto, depending upon the application, all of which can be readily accommodated on the same support frame, and without a need to have different support frames for different applications. For example, an operator can elect to have one, two, three or four electric machines mounted on the support frame of the implement coupler. Once the number of electric machines are selected, the electric machine(s) are fixedly attached to the support frame at electric machine mount(s)

on the support frame. The implement coupler allows for operation of the electric machine system with fewer electric machines and other components, and thereby at lower cost, in lower power applications, while also allowing for additional electric machines (up to a total of four in the embodiment shown) to be added at a later date if more power and functionality is desired. For example, a customer may request a single electric machine be provided as part of the initial electric machine system, and at a later date, one, two or three additional electric machines can be added to the electric machine system using the same support frame. In an embodiment, each electric machine are 56 volts alternators. The modular electric machine system also has one or more gearboxes and one or more endless members, which are each in the form of a belt in the illustrated example, coupled to the electric machine(s) for transmitting rotational power.

The following describes one or more example implementations of the disclosed implement coupler for a work vehicle, particularly aspects of dealing with the provision of adding power requirements to the system. Discussion herein may sometimes focus on the example tractor application, but the disclosed implement coupler is applicable to other types of work vehicles and implements.

Referring to FIG. 1,f a work vehicle 10, such as an agricultural tractor, has a frame 12 supported on ground engaging traction devices 14,16, such as wheels, tracks, and the like. A prime mover 18, such as an engine or electric drive, is mounted on the frame 12 and supplies power for driven components of the work vehicle 10. The prime mover 18, for example, is configured to drive a transmission 19, which is coupled to drive the ground engaging traction devices 14,16. An operator cab 20 is mounted on the frame 12 and contains a seat 22 for seating the operator, and various controls for the work vehicle 10, including an operator user interface 24, which has operator selectable buttons configured to enable the operator to control the operations and functions of the work vehicle 10, and has a steering wheel 26, and a power take-off control 28 for engaging and disengaging the power takeoff (PTO) 30 of the work vehicle 10. The PTO 30 is coupled to the transmission 19 and driven by the prime mover 18 and has a shaft 31 to provide mechanical power to an implement coupler 32. The implement coupler 32 is coupled to or part of a work implement 34 towed by the work vehicle 10. The operator user interface 24 includes a plurality of operator selectable buttons configured to enable the operator to control the operations and functions of the work vehicle 10.

Figure 2:
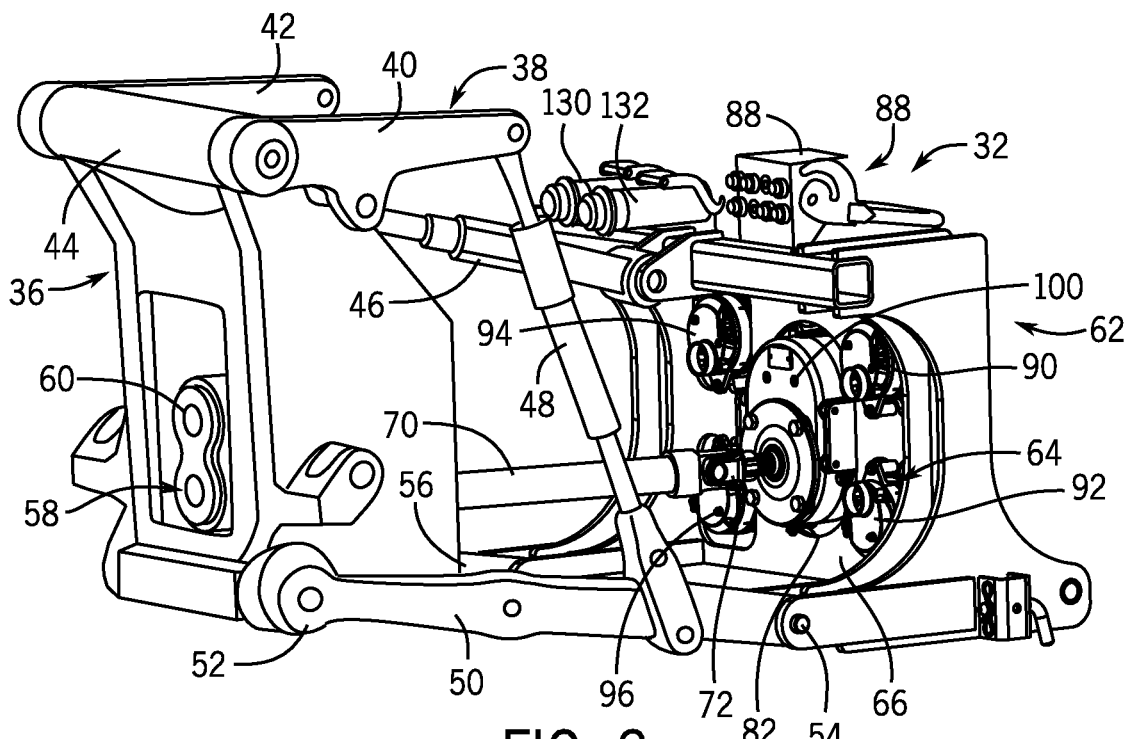
FIG. 2 is a rear perspective view of the example implement coupler for a work vehicle.

Referring also to FIGS. 2, the implement coupler 32 is operatively connected to a housing 36 which is fixedly coupled to the frame 12 of the vehicle 10 and extends from the rear of the vehicle 10. The implement coupler 32 is movable relative to the housing 36 by an adjustment mechanism 38. The adjustment mechanism 38 includes lift arms 40, 42 which are rotatably coupled to the housing 36 at a longitudinal axis of a support shaft 44 that extends between sides of the housing 36, a center link 46 operatively connected to the housing 36 and a top portion of the implement coupler 32 and adjusts the implement coupler 32 to lean toward or away from the work vehicle 10. Each lift arm 40, 42 extends from the support shaft 44 and has a terminating end respectively coupled to first and second lift links 48. The first lift link 48 is coupled to a first draft link 50 which is rotatably coupled to the housing 36 at a first end 52 and to the implement coupler 32 at a second end 54. The second lift link 48 is coupled to a second draft link 56 which is rotatably coupled to the housing 36 at a first end and to the implement coupler 32 at a second end.

A PTO gearbox 58 that is configured to couple to the PTO 30 of the work vehicle 10 is supported by the housing 36. The shaft 31 of the PTO 30 of the work vehicle 10 is coupled to and extends from the work vehicle 10 to connect with an input drive 60, which is rotatably driven by the PTO 30 of the work vehicle 10. The input drive 60 transfers the rotational mechanical energy of the PTO 30 of the work vehicle 10 to the implement coupler 32. The PTO gearbox 58 may be configured as a single-speed or multiple-speed gearbox and include various gears, clutches, brakes and the like.

The implement coupler 32 has a support frame 62 on which an electric machine system 64 is configured to be provided. The electric machine system 64 is modular in that a desired amount of electric machines, as described herein, can be provided, depending upon the application. The electric machine system 64 is considered to be "off-board" or not located on the work vehicle 10 itself. In various embodiments, control of the functions of the electric machine system 64 may be made through the user interface 24.

Figure 3:
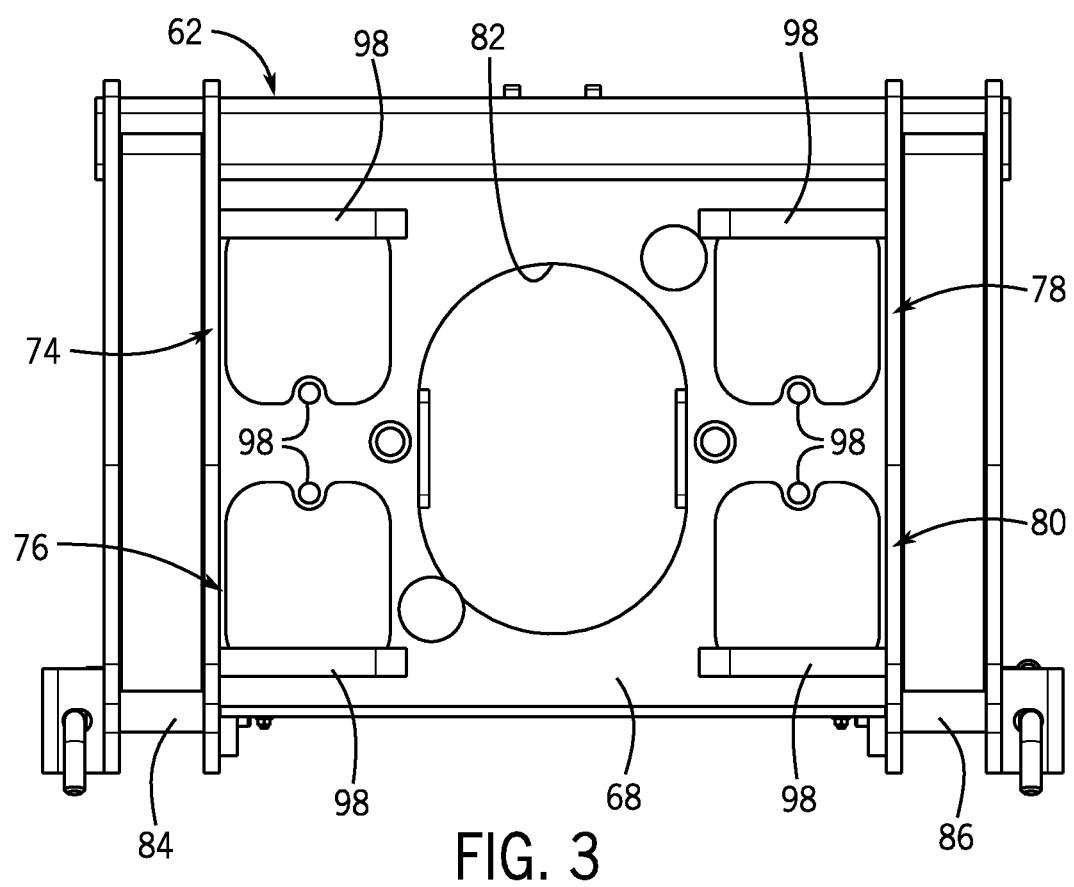
FIG. 3 is an elevational front view of a support frame of the example implement coupler.

The support frame 62 includes a first side 66 as shown in FIG. 2 and a second side 68 as shown in FIG. 3. A drive shaft 70 extends from the input drive 60, and has an end that is operatively connected to the electric machine system 64 at a pivotable coupling 72. The support frame 62 has an array of machine mounting locations 74, 76, 78, 80, and a drive opening 82 which extends from the first side 66 to the second side 68. In the embodiment as shown, first, second, third and fourth electric machine mounting locations 74, 76, 78, 80 which are spaced apart from each other are provided. In an embodiment and as shown, the drive opening 82 is centrally mounted on the support frame 62 so as to be between the mounting locations 74, 76, 78, 80. In the embodiment as shown, two of the mounting locations 74, 76 may be positioned on one lateral side (e.g., the left side) of the drive opening 82 and two of the mounting locations 78, 80 may be positioned on the other lateral side (e.g., the right side) of the drive opening 82. The left-side mounting locations 74, 76 may be aligned in an upright direction (e.g., vertically) with each other; the right-side mounting locations 78, 80 may be aligned upright (e.g., vertically) with each other; the upper mounting locations 74, 78 may be laterally aligned (e.g., horizontally) with each other; and the lower mounting locations 76, 80 may be laterally aligned (e.g., horizontally) with each other. It is to be understood that the mounting locations 74, 76, 78, 80 as shown are examples and that other mounting locations can be provided; the critical aspect is that the support frame 62 includes multiple mounting locations 74, 76, 78, 80. Connection points 84, 86 are provided on the second side 68 of the support frame 62 and form a hitch to which the work implements 34 are coupled (a third connection point may also be provided at a top end of the support frame 62). A line coupler 88 is fixedly coupled to the support frame 62 and provides a hose connection for delivering a fluid to hydraulically or pneumatically drive one or more functions of the implement 34.

The electric machine system 64 is designed to be modular such that an operator can elect to have an array of electric machines 90, 92, 94, 96, such as generators, motors or alternators, coupled thereto, depending upon the application, all of which can be easily accommodated on the same support frame 62, and without a need to have different support frames for different applications. As shown, an operator can elect to have one, two, three or four electric machines 90, 92, 94, 96 mounted on the support frame 62. Once the number of electric machines are selected, the electric machine(s) 90, 92, 94, 96 are fixedly attached to the support frame 62 at electric machine mount(s) 98 on the support frame 62 which are provided at the mounting locations 74, 76, 78, 80. In addition, the electric machine system 64 allows for additional electric machines (up to a total of four in the embodiment shown) to be added at a later date if more functionality is desired. For example, a customer may request a single electric machine be provided as part of the initial electric machine system 64, and at a later date, one, two or three additional electric machines can be added to the electric machine system 64 using the same support frame 62. In an embodiment, each electric machine 90, 92, 94, 96 are 56 volts alternators. Of course, electric machines of different capacities and quantities may be implemented in accordance with this disclosure.

The electric machine system 64 includes a gearbox 100 mounted to the support frame 62, at least one drive pulley 102, 104 mounted on a gearbox shaft 106 of the gearbox 100, and at least one belt 108, 110 mounted to the drive pulley 102, 104 and coupled to at least one electric machine 90, 92, 94, 96. The gearbox shaft 106 extends through the drive opening 82. The gearbox 100 is pivotably coupled to the drive shaft 70 at pivotable coupling 72 and is rotationally driven by the drive shaft 70 to impart rotation to the gearbox shaft 106. The gearbox 100 is operatively coupled to the drive shaft 70 and thus drives the electric machines 90, 92, 94, 96 via the drive pulley(s) 102, 104 and the belt(s) 108, 110 upon rotation of the drive shaft 70. Because the electric machine system 64 includes both a gearbox 100 and at least one belt 108, 110, the electric machine system 64 incorporates two stages of speed increase.

Each mounting location 74, 76, 78, 80 may be defined by an opening in the support frame 62, and the electric machine mounts 98 are provided proximate to the opening. As shown, electric machine mounts 98 are provided above and below the openings for mounting locations 74, 78 and take the form of L-shaped flanges above the openings which extend outward from the second side 68 and pins below the openings which extend outward from the second side 68, and electric machine mounts 98 are provided above and below the openings for mounting locations 76, 78 and take the form of pins above the openings which extend outward from the second side 68 and L-shaped flanges below the openings which extend outward from the second side 68. Other suitable electric machine mounts can be provided, such as pins, holes for fasteners, flanges, tabs for flanges, etc. The electric machine mounts 98 may be provided anywhere proximate to the opening, such as, but not limited to, the sides of the openings.

Figure 4:
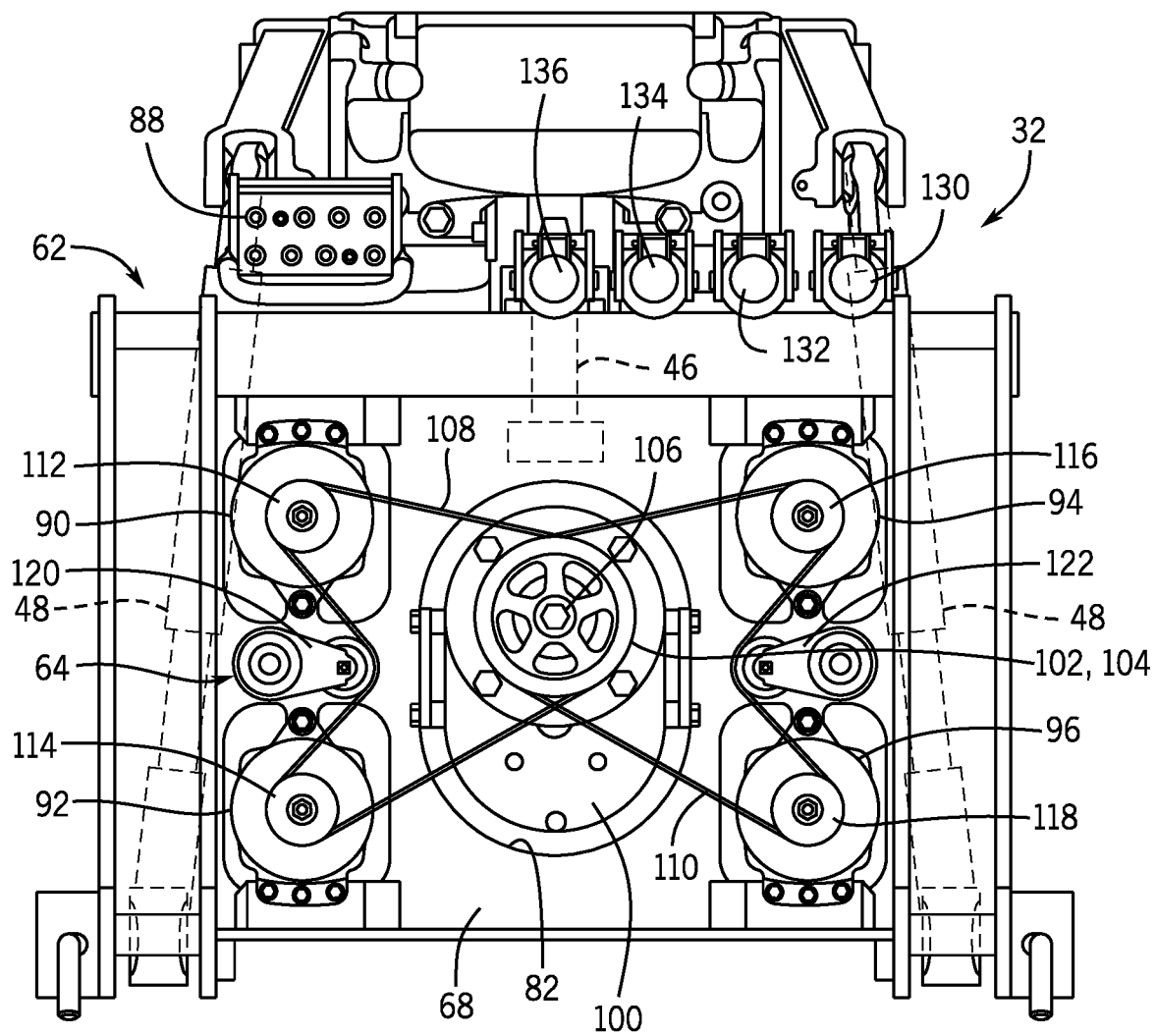
FIG. 4 is an elevational front view of the example implement coupler according to a first implementation.

As shown in FIG. 4, if four electric machines 90, 92, 94, 96 are desired to be part of the electric machine system 64, a pair of drive pulleys 102, 104 (with drive pulley 104 being stacked on top of the drive pulley 102) are coupled to the gearbox shaft 106, and the electric machines 90, 92, 94, 96 are fixedly mounted onto the support frame 62 by the electric machine mounts 98 at each mounting location 74, 76, 78, 80. The first belt 108 is coupled around an input pulley 112 of the electric machine 90, around an input pulley 114 of the electric machine 92, and around drive pulley 102. The second belt 110 is coupled around an input pulley 116 of the electric machine 94, around an input pulley 118 of the electric machine 96, and around drive pulley 104. A first belt tensioner 120 is mounted on the support frame 62 between the electric machines 90, 92 and is configured to tension the belt 108. A second belt tensioner 122 is mounted on the support frame 62 between the electric machines 94, 96 and is configured to tension the belt 110. In the embodiment as shown, the first belt 108 is coupled to the left-hand electric machines 90, 92 and the second belt 110 is coupled to the right-hand electric machines 94, 96. In an embodiment, a first belt is coupled to three of the electric machines and the first drive pulley, and a second belt is coupled to one of the electric machines and the second drive pulley. In an embodiment, a single belt is coupled to all of the electric machines, and includes one or more drive pulleys.

Figure 5:
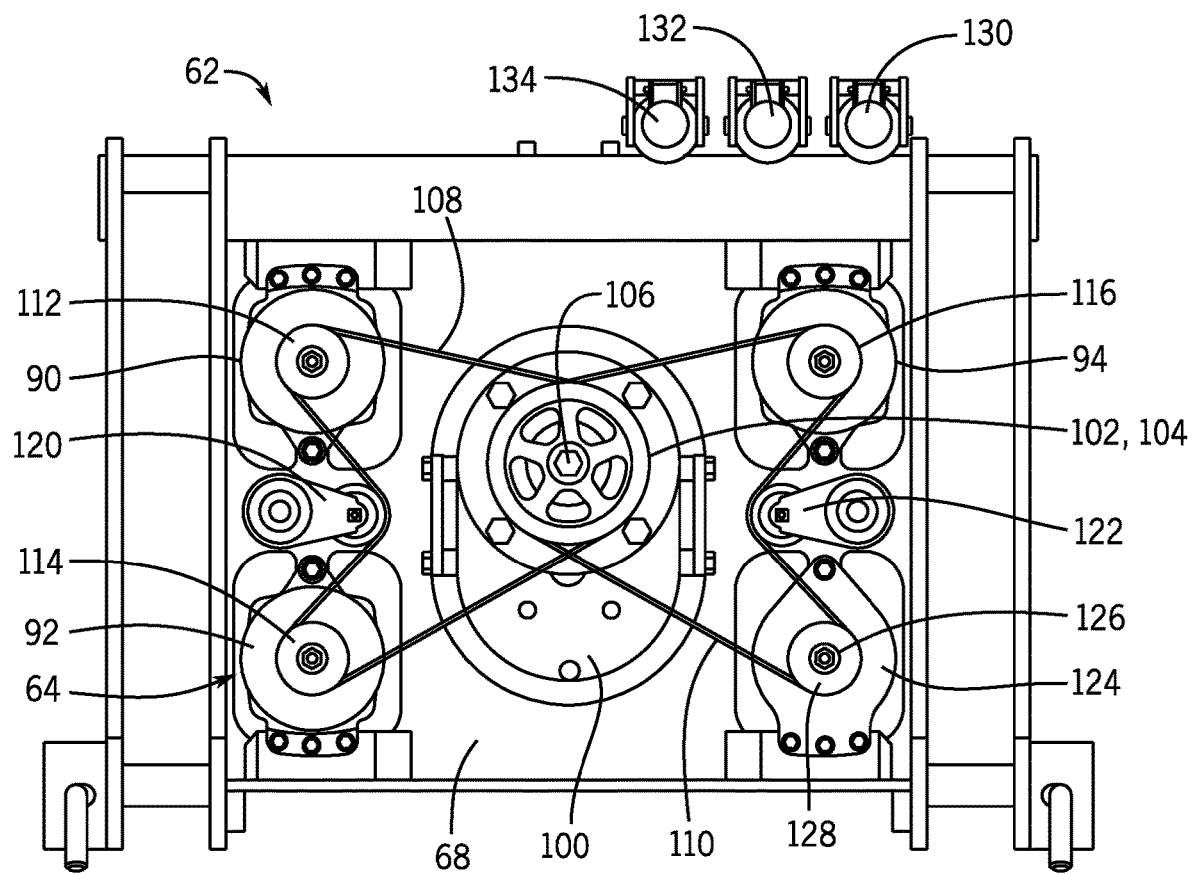
FIG. 5 is an elevational front view of the example implement coupler according to a second implementation.

As shown in FIG. 5, if three electric machines 90, 92, 94 are desired to be part of the electric machine system 64, drive pulleys 102, 104 (with drive pulley 104 being stacked on top of the drive pulley 102) are coupled to the gearbox shaft 106, the electric machines 90, 92, 94 are fixedly mounted onto the support frame 62 by the electric machine mounts 98 at each mounting location 74, 76, 78, and a plate 124 having a shaft 126 extending therefrom is fixedly coupled to the support frame 62 by the electric machine mounts 98 at mounting location 80 and has an idler pulley 128 rotatably coupled thereto. The first belt 108 is coupled around input pulleys 112, 114 of the electric machines 90, 92, and around the drive pulley 104. The second belt 110 is coupled around input pulley 116 of the electric machine 94, around idler pulley 128, and around drive pulley 104. The first belt tensioner 120 is mounted on the support frame 62 between the electric machines 90, 92 and is configured to tension the belt 108. The second belt tensioner 122 is mounted on the support frame 62 between the electric machine 94 and the idler pulley 128 and is configured to tension the belt 110. In the embodiment as shown, the first belt 108 is coupled to the left-hand electric machines 90, 92 and the second belt 110 is coupled to the right-hand electric machines 94, 96. In an embodiment, a single belt is coupled to the electric machines and includes one or more drive pulleys, and the idler pulley is eliminated.

Figure 6:
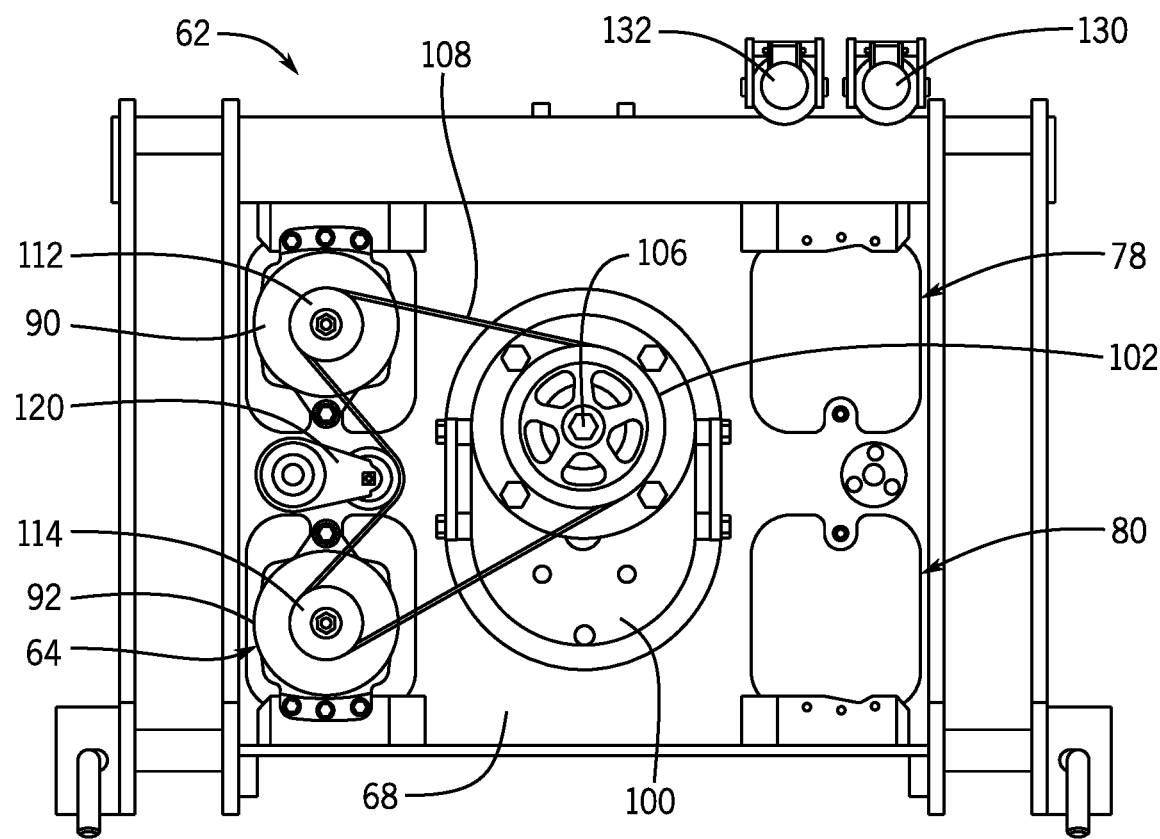
FIG. 6 is an elevational front view of the example implement coupler according to a third implementation.

As shown in FIG. 6, if two electric machines 90, 92 are desired to be part of the electric machine system 64, drive pulley 102 is mounted on the gearbox shaft 106, and the electric machines 90, 92 are fixedly mounted on the support frame 62 by the electric machine mounts 98 at each of the mounting locations 74, 76. The belt 108 is coupled around the input pulleys 112, 114 of the electric machines 90, 92, and around the drive pulley 102. The belt tensioner 120 is mounted on the support frame 62 between the electric machines 90, 92 and is configured to tension the belt 108. The electric machines 90, 92 can be positioned at any two of the mounting locations, and the other two mounting locations remain unused. Alternatively, the first belt 108 can be coupled around the input pulley 112 of the electric machine 90, and around the drive pulley 102, and the second belt 110 and drive pulley 104 can be provided, and the second belt 110 coupled around the input pulley 114 of the electric machine 92, and around the drive pulley 104.

Figure 7:
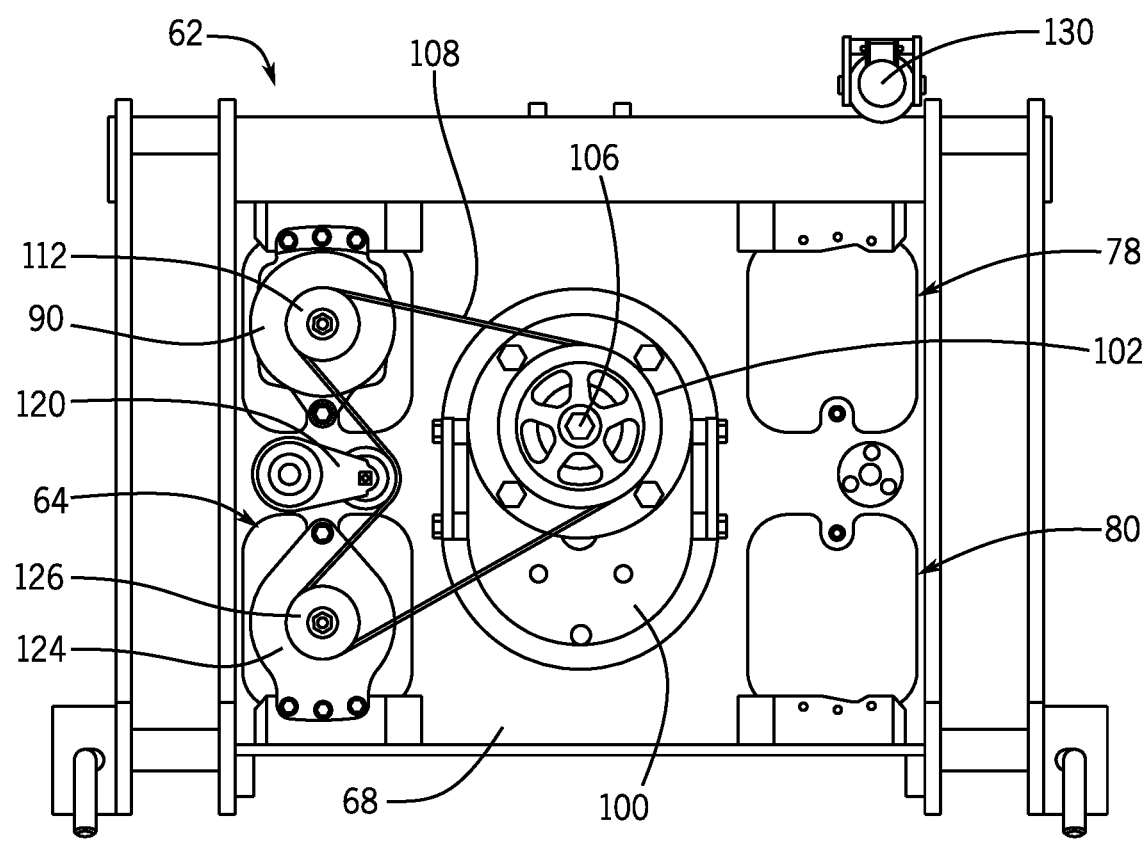
FIG. 7 is an elevational front view of the example implement coupler according to a fourth implementation.

As shown in FIG. 7, if one electric machine 90 is desired to be part of the electric machine system 64, drive pulley 102 is mounted on the gearbox shaft 106, electric machine 90 is fixedly mounted on the support frame 62 by the electric machine mount 98 at mounting location 74, and plate mounted rotatable idler pulley 128 is mounted on the support frame 62 by the electric machine mount 98 at mounting location 76. Belt 108 is coupled around the input pulley 112 of the electric machine 90, around the idler pulley 128, and around the drive pulley 102. Belt tensioner 120 is mounted on the support frame 62 between the electric machine 90 and the idler pulley 128 and is configured to tension the belt 108.

While belt tensioners 120, 122 and idler pulleys 128 are shown and described and assist in optimizing contact of the belts 108, 110 with the electric machines 90, 92, 94, 96, the belt tensioners 120, 122 and idler pulleys 128 may be eliminated.

Figure 8:
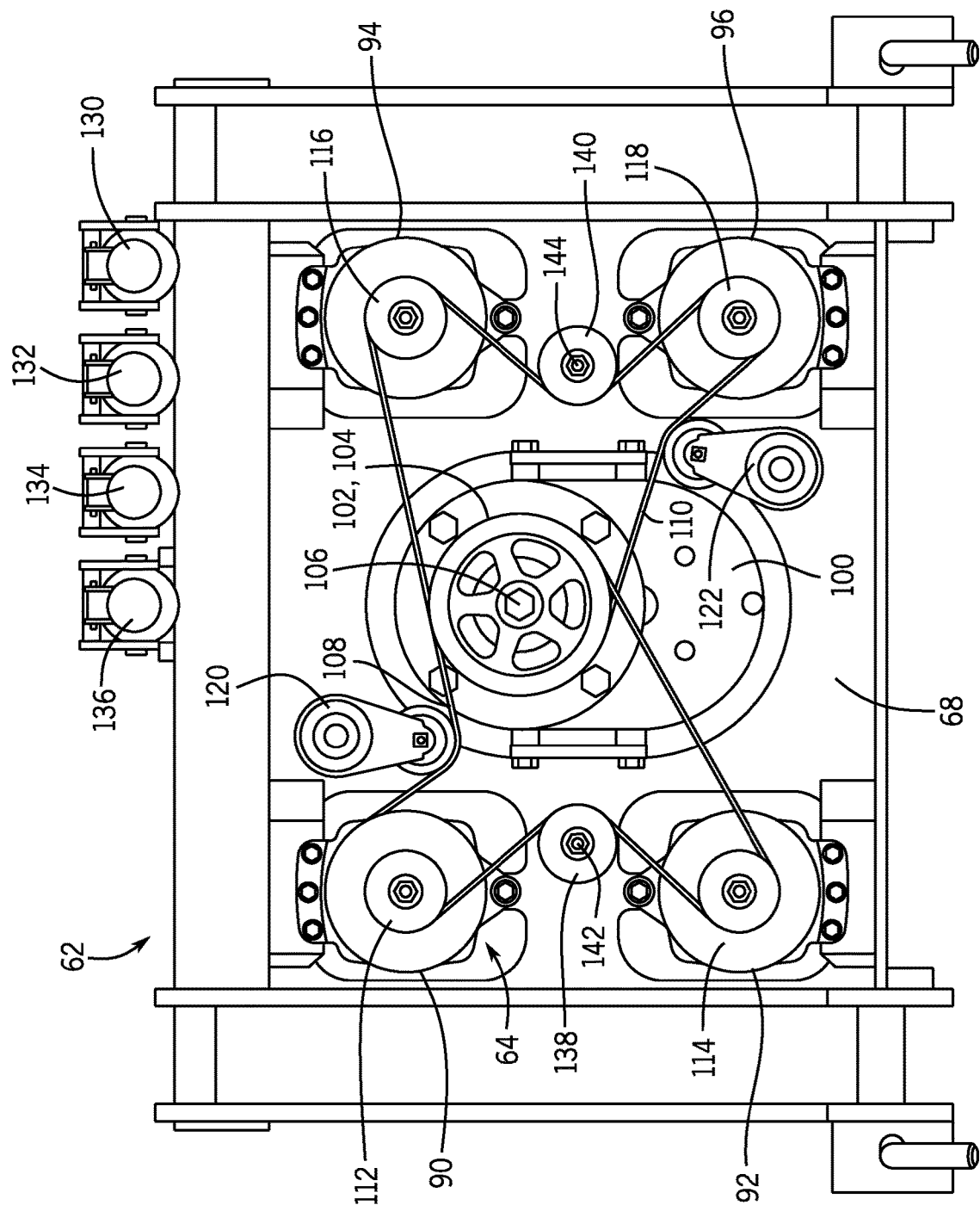
FIG. 8 is an elevational front view of the example implement coupler according to a fifth implementation.

FIG. 8 provides another example of the positioning of the belt tensioners 120, 122 on the support frame 62. In FIG. 8, belt tensioner 122 is mounted on the support frame 62 between the electric machine 90 and the drive pulley 104 and is configured to tension the belt 108, and belt tensioner 122 is mounted on the support frame 62 between the electric machine 96 and the drive pulley 104 and is configured to tension the belt 110. Idler pulleys 138, 140 are rotatably mounted on shafts 142, 144 extending from the support frame 62. With the embodiment of FIG. 8, if three electric machines 90, 92, 94 are desired to be part of the electric machine system 64, drive pulleys 102, 104 (with drive pulley 104 being stacked on top of the drive pulley 102) are coupled to the gearbox shaft 106, the electric machines 90, 92, 94 are fixedly mounted onto the support frame 62 by the electric machine mounts 98 at each mounting location 74, 76, 78, and idler pulleys 138, 140 are mounted on the support frame 62. The first belt 108 is coupled around input pulleys 112, 114 of the electric machines 90, 92, and around the drive pulley 104. The second belt 110 is coupled around input pulley 116 of the electric machine 94, around idler pulley 140, and around drive pulley 104 (mounting location 80 is not used). If one electric machine 90 is desired to be part of the electric machine system 64, drive pulley 102 is mounted on the gearbox shaft 106, electric machine 90 is fixedly mounted on the support frame 62 by the electric machine mount 98 at mounting location 74 (mounting locations 76, 78, 80 are not used), and idler pulley 138 is mounted on the support frame 62. Belt 108 is coupled around the input pulley 112 of the electric machine 90, around the idler pulley 128, and around the drive pulley 102.

The drive pulleys 102, 104, the input pulleys 112, 114, 116, 118, and idler pulleys 128, 138, 140 may be grooved wheels or sheaves or have teeth which intermesh with teeth of the belts 108, 110. While two separate drive pulleys 102, 104 are shown and described, a single drive pulley which includes two separate grooves or sheaves on can be provided.

The specific orientations of the electric machines 90, 92, 94, 96, belt tensioners 120, 122 and idler pulleys 128 are for example purposes only and the electric machines 90, 92, 94, 96 can be designed to be positioned on the support frame 62 at any of the mounting locations as desired, and the belt tensioners 120, 122 and idler pulleys 128 can be designed to be positioned in different locations than what is shown in the drawings.

Each electric machine 90, 92, 94, 96 generates electrical power during rotational movement of the drive shaft 70. The electric machine power is made available to an operator of the work vehicle 10 or to an operator of the work implement through electrical couplers 130, 132, 134, 136 fixedly coupled to the operator user interface 24. Each electrical coupler 130, 132, 134, 136 is electrically coupled to one of the electric machines 90, 92, 94, 96 through an electrical cable (not shown). If one electric machines 90 is provided, then one electrical coupler 130 is provided; if two electric machines 90, 92 are provided, then two electrical couplers 130, 132 are provided; if three electric machines 90, 92, 94 are provided, then three electrical couplers 130, 132, 134 are provided; if four electric machines 90, 92, 94, 96 are provided, then four electrical couplers 130, 132, 134 136 are provided. Each electrical coupler 130, 132, 134, 136 may include a communication connector having an input operatively connected to the electrical system of the work vehicle 10, such as a CAN (controller area network) bus to transmit command signals to the implement coupler 32. In different embodiments, the communication connector is operatively connected to an implement traction device, a powered axle drive, or to other functions provided by the implement coupler 32 that require control functions provided by the operator. In one embodiment, the communication connector is provided at the electrical couplers 130, 132, 134, 136.

The present disclosure thus provides an off-board power and implement coupler that provides mechanical power, hydraulic power, and electrical power for work implements. Since the implement coupler, in different embodiments, supports one or more electric machines, the selection of the electric machine(s) can be tailored to the specific implement being powered without having multiple support frames. Integrating the electric machines and associated drive components into the implement coupler provides for multiple applications with the same support frame.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An implement coupler for a work vehicle including a power takeoff (PTO), the implement coupler comprising:
   a support frame having a drive opening and an array of electric machine mounts arranged about the drive opening;
   a gearbox mounted on the support frame and having a gearbox shaft extending through the drive opening, wherein the gearbox is configured to receive rotational power from the PTO;
   at least one drive pulley coupled to the gearbox for rotation;
   at least one endless member disposed about the at least one drive pulley for rotation therewith; and
   a first electric machine mounted on the support frame at a first of the electric machine mounts and having a first input pulley coupled to the at least one drive pulley by the at least one endless member.

2. The implement coupler of claim 1, further including a second electric machine mounted on the support frame at a second of the electric machine mounts and having a second input pulley coupled to the at least one drive pulley by the at least one endless member.

3. The implement coupler of claim 2, further including a third electric machine mounted on the support frame at a third of the electric machine mounts and having a third input pulley coupled to the at least one drive pulley by the at least one endless member.

4. The implement coupler of claim 3, further including an idler pulley mounted on the support frame at a fourth of the electric machine mounts and coupled to the at least one drive pulley by the at least one endless member.

5. The implement coupler of claim 3, further including a fourth electric machine mounted on the support frame at a fourth of the electric machine mounts and having a fourth input pulley coupled to the at least one drive pulley by the at least one endless member.

6. The implement coupler of claim 1, further including:
   a second electric machine mounted on the support frame at a second of the electric machine mounts and having a second input pulley;
   wherein the at least one endless member includes a first endless member and a second endless member;
   wherein the first input pulley is coupled to the at least one drive pulley by the first endless member; and
   wherein the second input pulley is coupled to the at least one drive pulley by the second endless member.

7. The implement coupler of claim 6, wherein the at least one drive pulley comprises a first drive pulley coupled to the gearbox shaft and coupled to the first endless member, and a second drive pulley coupled to the gearbox shaft and coupled to the second endless member.

8. The implement coupler of claim 1, further including:
   a second electric machine mounted on the support frame at a second of the electric machine mounts and having a second input pulley;
   a third electric machine mounted on the support frame at a third of the electric machine mounts and having a third input pulley; and
   a fourth electric machine mounted on the support frame at a fourth of the electric machine mounts and having a fourth input pulley;
   wherein the at least one endless member includes a first endless member and a second endless member;
   wherein the first input pulley and the second input pulley are coupled to the at least one drive pulley by the first endless member; and
   wherein the third input pulley and the fourth input pulley are coupled to the at least one drive pulley by the second endless member.

9. The implement coupler of claim 8, wherein the at least one drive pulley comprises a first drive pulley coupled to the gearbox shaft and coupled to the first endless member, and a second drive pulley coupled to the gearbox shaft and coupled to the second endless member.

10. The implement coupler of claim 1, further including an idler pulley mounted on the support frame at a second of the electric machine mounts and coupled to the at least one drive pulley by the at least one endless member.

11. The implement coupler of claim 1, further in combination with a tractor including a frame and a prime mover, and having the power takeoff operatively connected to the prime mover, wherein the prime mover is configured to drive the power takeoff to provide a mechanical force.

12. An implement coupler for a work vehicle including a power takeoff (PTO), the implement coupler comprising:
   a support frame configured to support a first electric machine at a first machine mounting location, a second electric machine at a second machine mounting location, a third electric machine at a third machine mounting location, and a fourth electric machine at a fourth machine mounting location;
   a gearbox mounted on the support frame, the gearbox having a gearbox shaft extending therefrom, wherein the gearbox is configured to receive rotational power from the PTO; and
   wherein, in a first configuration, the first electric machine is mounted on the support frame, a drive pulley is mounted on the gearbox shaft, and a belt is coupled to the first electric machine and to the drive pulley,
   wherein, in a second configuration, the first and second electric machines are mounted on the support frame, a drive pulley is mounted on the gearbox shaft, and a belt is coupled to the first and second electric machines and to the drive pulley, wherein, in a third configuration, the first, second and third electric machines are mounted on the support frame, first and second drive pulleys are mounted on the gearbox shaft, a first belt is coupled to the first and second electric machines and to the first drive pulley, and a second belt is coupled to the third electric machine and to the second drive pulley, and wherein, in a fourth configuration, the first, second, third and fourth electric machines are mounted on the support frame, first and second drive pulleys are mounted on the gearbox shaft, a first belt is coupled to the first and second electric machines and to the first drive pulley, and a second belt is coupled to the third and fourth electric machines and to the second drive pulley.

13. The implement coupler of claim 12, wherein, in the first configuration, an idler pulley is mounted on the support frame in the second machine mounting location and the belt of the first configuration is further coupled thereto; and wherein, in the third configuration, a second idler pulley is mounted on the support frame in the fourth machine mounting location and the second belt is further coupled thereto.

14. The implement coupler of claim 13, wherein, in the first configuration, a belt tensioner is mounted on the support frame between the first machine mounting location and the second machine mounting location and engaged with the belt; and Wherein, in the fourth configuration, a first belt tensioner is mounted on the support frame between the first machine mounting location and the second machine mounting location and engaged with the first belt, and a second belt tensioner is mounted on the support frame between the third machine mounting location and the fourth machine mounting location and engaged with the second belt.

15. The implement coupler of claim 13, wherein, in the first configuration, a belt tensioner is mounted on the support frame between the first machine mounting location and the gearbox shaft and engaged with the belt; and wherein, in the fourth configuration, a first belt tensioner is mounted on the support frame between the first machine mounting location and the gearbox shaft and engaged with the first belt, and a second belt tensioner is mounted on the support frame between the fourth machine mounting location and the gearbox shaft and engaged with the second belt.

16. The implement coupler of claim 15, wherein, in the first configuration, an idler pulley is mounted on the support frame between the first machine mounting location and the second machine mounting location and engaged with the belt; and wherein, in the fourth configuration, a first idler pulley is mounted on the support frame between the first machine mounting location and the second machine mounting location and engaged with the first belt, and a second idler pulley is mounted on the support frame between the third machine mounting location and the fourth machine mounting location and engaged with the second belt.

17. The implement coupler of claim 12, further comprising an input drive operatively connected to the gearbox and to the power takeoff.

18. The implement coupler of claim 17, further comprising first, second, third, and fourth electrical couplers configured to be coupled to the support frame, wherein the first electrical coupler is configured to be electrically coupled to the first electric machine, the second electrical coupler is configured to be electrically coupled to the second electric machine, the third electrical coupler is configured to be electrically coupled to the third electric machine, and the fourth electrical coupler is configured to be electrically coupled to the fourth electric machine, wherein each electrical coupler includes an output configured to provide access to the generated electrical power.

19. The implement coupler of claim 18, further comprising a gearbox shaft operatively coupled to the input drive and to the gearbox, wherein the gearbox shaft is configured to transfer a mechanical force provided by the power takeoff to the gearbox.

20. The implement coupler of claim 12, further in combination with a tractor including a frame and a prime mover, and having a power takeoff operatively connected to the prime mover, wherein the prime mover is configured to drive the power takeoff to provide a mechanical force.

* * * * *